Patented Aug. 27, 1940

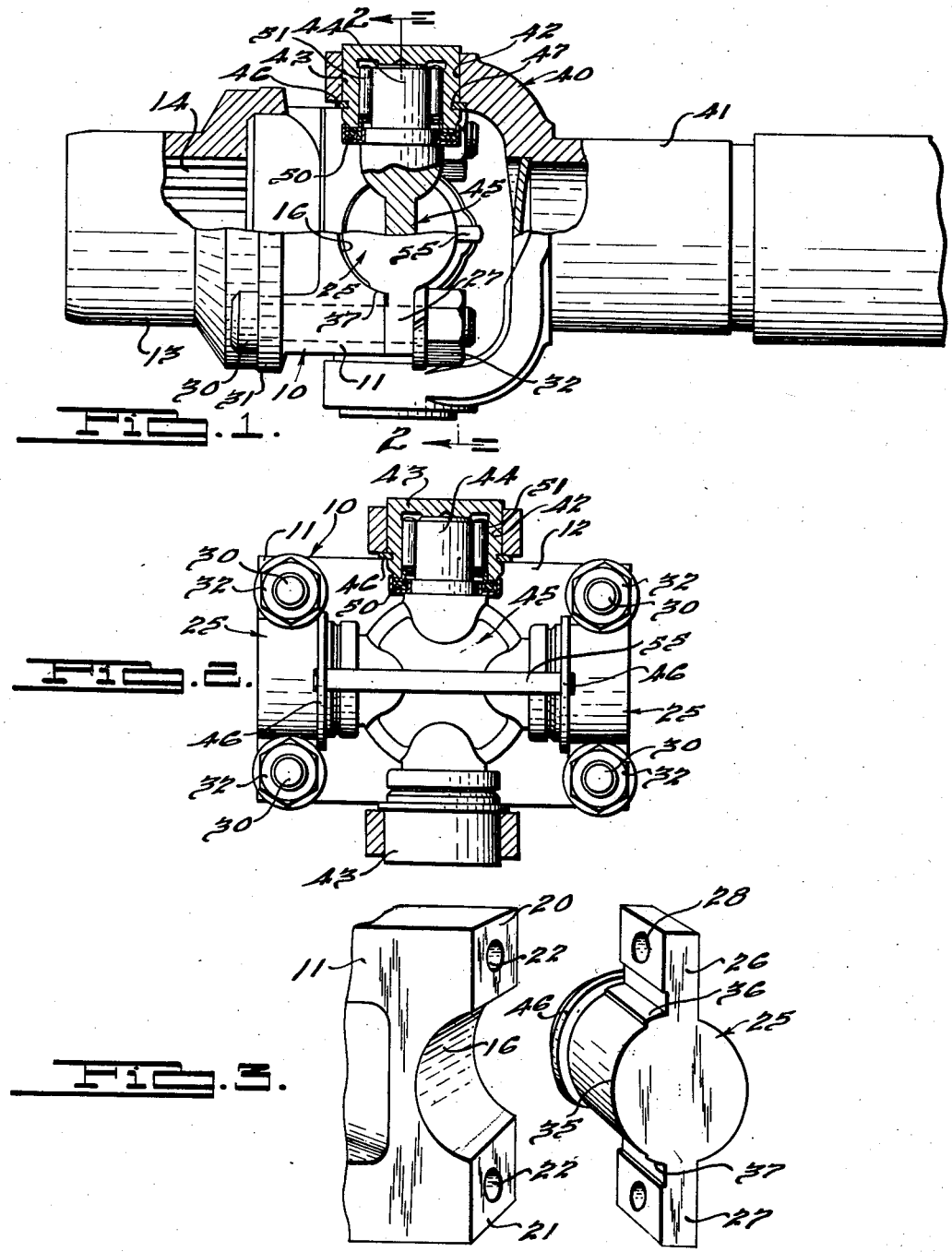

2,212,763

UNITED STATES PATENT OFFICE 2,212,763

UNIVERSAL JOINT

Hans Wollner, Detroit, Mich., assignor to Universal Products Company, Incorporated, Dearborn, Mich., a corporation of Delaware Application October 16, 1939, Serial No. 299,630

5 Claims. (Cl. 64—17)

The invention relates generally to joints for shafts and it has particular relation to a joint of the universal type.

In certain respects the invention is similar to and constitutes an improvement over those embodied in my copending applications for patent relating to universal joints, Serial No. 226,029, filed August 22, 1938,, and Serial No. 251,075, filed January 16, 1939. In both of such applications for patent, a joint is provided which includes bearing blocks that are fastened in position on a yoke by means of axially extending bolts. Such constructions permit the joint and shaft members to be assembled by axially and relatively moving the parts into proper positions.

One object of the present invention is to provide a joint of this general type having improved means for transmitting torsional forces during operation of the joint.

Another object of the invention is to provide an improved joint of this general character wherein the yoke and bearing blocks may be assembled easily while still obtaining an accurate positioning of the parts relative one to another.

Another object of the invention is to provide an improved joint of this character which may be manufactured inexpensively and which particularly may be manufactured in an efficient manner by means of broaching operations.

Other objects of the invention will become apparent from the following specification, from the drawing to which it relates, and from the claims hereinafter set forth.

For a better understanding of the invention, reference may be had to the drawing wherein:

Figure 1 is an elevational view of a joint and shaft assembly, partly in cross-section, wherein the joint is constructed according to one form of the invention;

Fig. 2 is a cross-sectional view taken substantially along the line 2—2 of Fig. 1;

Fig. 3 is a detail view illustrating one of the bearing blocks and the yoke and recess therein for receiving the block.

Referring to Figs. 1 and 2, the joint illustrated includes a yoke member 10 having diametrically opposed ears 11 and 12 secured thereto and a cylindrical portion 13 provided with internal teeth 14, by means of which the yoke may be secured to an engine drive shaft, not shown, projecting from the transmission of the motor vehicle. As shown by Figs. 1 and 3, each of the ears 11 and 12 is recessed at its axial side opposite the cylindrical portion 13, and this recess is of arcuate character, as indicated at 16. It will be observed that the recess is not larger in circumference than half of a circle and that the recesses are open towards one end of the longitudinal axis of the joint, or in other words open towards one end of the axis of the shafts to which the joint is connected. At each side of the recess 16, bearing surfaces 20 and 21 are provided and these surfaces are in the same plane. Also, at each side of the recess 16, the ear has an aperture 22 which extends through the ear and which is adapted to receive a fastening bolt to be described presently.

Each of the ears is adapted to support a bearing block 25 having wings 26 and 27 adapted, respectively, to bear against the surfaces 20 and 21. Like the ear, the wings 26 and 27 are apertured as indicated at 28, and when the wings are against the surfaces 20 and 21, the block may be secured in position by means of headed bolts 30 extending through the apertures and through the yoke member 10. Nuts 32, fastened on the other and threaded ends of the bolts at the outer side of the wings of the bearing block, rigidly secure the parts in position.

Each bearing block between the wings is of generally cylindrical character and a cylindrical part of it is adapted to be disposed within the recess 16 of the yoke. However, it is to be noted that the cylindrical surface of the block within the recess has a reduced radius along its intermediate portion as indicated at 35, so as to leave oppositely disposed curved contact surfaces 36 and 37 and when the block is fitted in the recess, the cylindrical surface 35 intermediate the two contact surfaces 36 and 37 becomes slightly spaced from the surface of the recess, while the contact surfaces 36 and 37 fit against opposite sides of the recess surface. All such surfaces are concentric.

The joint also includes a yoke 40 on a shaft member 41 and this yoke has openings 42 for receiving bearing cups 43. The cups, as well as the bearing blocks 25, are adapted, respectively, to receive trunnions 44 on a cross 45. A split ring 46 at the inner end of each cup or block and which is located in a groove 47 in the outer surface of the block or cup, as the case may be, engages the inner side of the yoke ear and radially locates the block or cup and holds the inner surface of its end wall against the end of the trunnion. A sealing means 50 at the inner end of such bearing prevents the escape of lubricant and prevents dirt from getting into the bearing. Small roller bearings 51 are provided within the blocks and cups and around the trunnions, as will be understood. A tie element 55, as shown by Fig. 2, is connected to the two split rings 46 on the two bearing blocks, and this spring holds the blocks properly on opposed trunnions of the cross until the parts are assembled with the yoke ears 11 and 12.

Assuming that the yoke 40, bearing cups 43 and blocks 25 are assembled with the cross 45, then it is only necessary to move the assembly axially into proper relation with the ears 11 and 12. It is manifest that the two bearing blocks will easily move into the recesses 16 since the recesses flare upwardly and are not greater than semi-cylindrical in character and since the curved surfaces 36 and 37 on the bearing blocks will easily fit against the opposite ends of the recess surfaces 16 without interference or difficulty. In other words, anyone moving the bearing blocks into the recesses 16 can do so easily, since the parts and curved surfaces will move naturally into proper relation. Once in position with the spring rings 46 engaged under the inner sides of the yoke, as shown by Fig. 2, then it is only necessary to place the nuts on the bolts 30 and to draw the parts into tight and locked relation.

Each of the yokes and the bearing blocks may be manufactured inexpensively through broaching operations and the curved surfaces facilitate this manufacture. Aside from this factor of manufacturing, it will be evident that the curved surfaces 36 and 37 constitute torsional drive contacts which prevent torsion from being taken through the bolts and it is evident also that the surfaces are of such shape and are so arranged that torsional forces will clearly be taken by them so long as the bearing blocks are maintained within the recess by the bolts. Ease of axial assembly is obtained, while still effecting a positive drive through the contacting surfaces without possibility of the blocks moving out of the recesses.

Although only one form of the invention has been illustrated and described in detail, it will be apparent to those skilled in the art that various modifications may be made without departing from the scope of the appended claims.

What is claimed is:

1. In a universal joint, a trunnion disposed transversely to the joint axis, a bearing block member having an opening receiving the trunnion, a yoke member disposed transversely to the joint axis and having a recess that is open at one side towards one end of the joint axis for receiving the bearing block member and allowing assembly thereof by relative movement of the members axially of the joint axis, means for connecting the members together, and means for transmitting torsional forces from one member to the other and comprising contacting surfaces on the members at opposite sides of the recess which are diverging in a direction towards the open side of the recess, the members intermediate said surfaces being separated axially of the joint whereby positive and accurate contacting of said surfaces is insured without difficulty or interference.

2. In a universal joint, a trunnion disposed transversely to the joint axis, a bearing block member having an opening receiving the trunnion, a yoke member disposed transversely to the joint axis and having a recess that is open at one side towards one end of the joint axis for receiving the bearing block member and allowing assembly thereof by relative movement of the members axially of the joint axis, means for connecting the members together, and means for transmitting torsional forces from one member to the other and comprising contacting curved surfaces on the members at opposite sides of the recess which are diverging in a direction towards the open side of the recess, the members intermediate said surfaces being separated axially of the joint whereby positive and accurate contacting of said surfaces is insured without difficulty or interference.

3. In a universal joint, a trunnion disposed transversely to the joint axis, a bearing block member having an opening receiving the trunnion, a yoke member disposed transversely to the joint axis and having a recess that is open at one side towards one end of the joint axis for receiving the bearing block member and allowing assembly thereof by relative movement of the members axially of the joint axis, means for connecting the member together, and means for transmitting torsional forces from one member to the other and comprising contacting concentric surfaces at opposite sides of the recess which are diverging towards the open side of the recess, the members intermediate said surfaces being separated axially of the joint whereby positive and accurate contacting of said surfaces is insured without difficulty or interference.

4. In a universal joint, a trunnion disposed transversely to the joint axis, a bearing block member having an opening receiving the trunnion, a yoke member disposed transversely to the joint axis and having a recess that is open at one side towards one end of the joint axis for receiving the bearing block member and allowing assembly thereof by relative movement of the members axially of the joint axis, means for connecting the members together, and means for transmitting torsional forces from one member to the other and comprising contacting concentric surfaces at opposite sides of the recess which are diverging towards the open side of the recess, the members intermediate said surfaces being concentrically curved but separated axially of the joint whereby positive and accurate contacting of said surfaces is insured without difficulty or interference.

5. In a universal joint, a trunnion disposed transversely to the joint axis, a bearing block member having an opening receiving the trunnion, a yoke member disposed transversely to the joint axis and having a recess that is open at one side towards one end of the joint axis for receiving the bearing block member and allowing assembly thereof by relative movement of the members axially of the joint axis, means for connecting the members together, and means for transmitting torsional forces from one member to the other and comprising contacting concentric surfaces at opposite sides of the recess which are diverging towards the open side of the recess, the surfaces of the members intermediate the contacting surfaces being concentric to each other and also concentric to said contacting surfaces with the intermediate surface on one member of the same radius as that of the contacting surfaces and with the intermediate surface on the other member of a different radius, whereby positive and accurate contacting of said contacting surfaces is insured without dfficulty or interference.

HANS WOLLNER.